United States Patent [19]

Nazarian et al.

[11] 4,295,946
[45] Oct. 20, 1981

[54] METHOD AND APPARATUS FOR ELECTROCHEMICAL PURIFICATION OF CONTAMINATED LIQUIDS

[76] Inventors: Miron M. Nazarian, ulitsa Bljukhera, 13, kv. 138; Vyacheslav T. Efimov, ulitsa Sumskaya, 59, Kv. 2; Alexandr A. Axenko, ulitsa Bairona, 152, kv. 25; Vladimir A. Kolyada, ulitsa Petrozavodskaya, 91a, kv. 30; Ljudmila F. Shamsha, ulitsa Dinamovskaya, 3, kv. 23, all of Kharkov, U.S.S.R.

[21] Appl. No.: 176,334

[22] Filed: Aug. 8, 1980

[51] Int. Cl.³ ............................................... C02F 1/46
[52] U.S. Cl. .................... 204/149; 204/241; 204/274
[58] Field of Search ............... 204/186, 149, 239, 241, 204/262, 274

[56] References Cited

U.S. PATENT DOCUMENTS

| | | | |
|---|---|---|---|
| 3,663,413 | 5/1972 | Marmo | 204/149 |
| 3,756,933 | 9/1973 | Greenberg | 204/149 |
| 4,120,765 | 10/1978 | King | 204/149 |

Primary Examiner—T. M. Tufariello
Attorney, Agent, or Firm—Robert E. Burns; Emmanuel J. Lobato; Bruce L. Adams

[57] ABSTRACT

A method comprises heating contaminated liquid, cooling electrolyte and subsequently passing the latter through soluble electrodes provided within an electrocoagulation chamber. Next, mixing the heated contaminated liquid is accomplished above the soluble electrodes with an ascending flow of cooled air containing products of dissolution of the soluble electrodes, followed by separating formed foam and sludge within a settling chamber.

Apparatus having a settling chamber provided with an outlet pipe to discharge purified liquid. Inside the settling chamber, there is disposed an electrocoagulation chamber provided with an inlet pipe to feed contaminated liquid thereinto, and an inlet pipe to feed electrolyte. In the bottom portion of the electrocoagulation chamber, there is disposed a system of soluble electrodes. A heater communicates with the inlet pipe to feed a contaminated liquid, while a condenser communicates with the inlet pipe to feed electrolyte.

3 Claims, 1 Drawing Figure

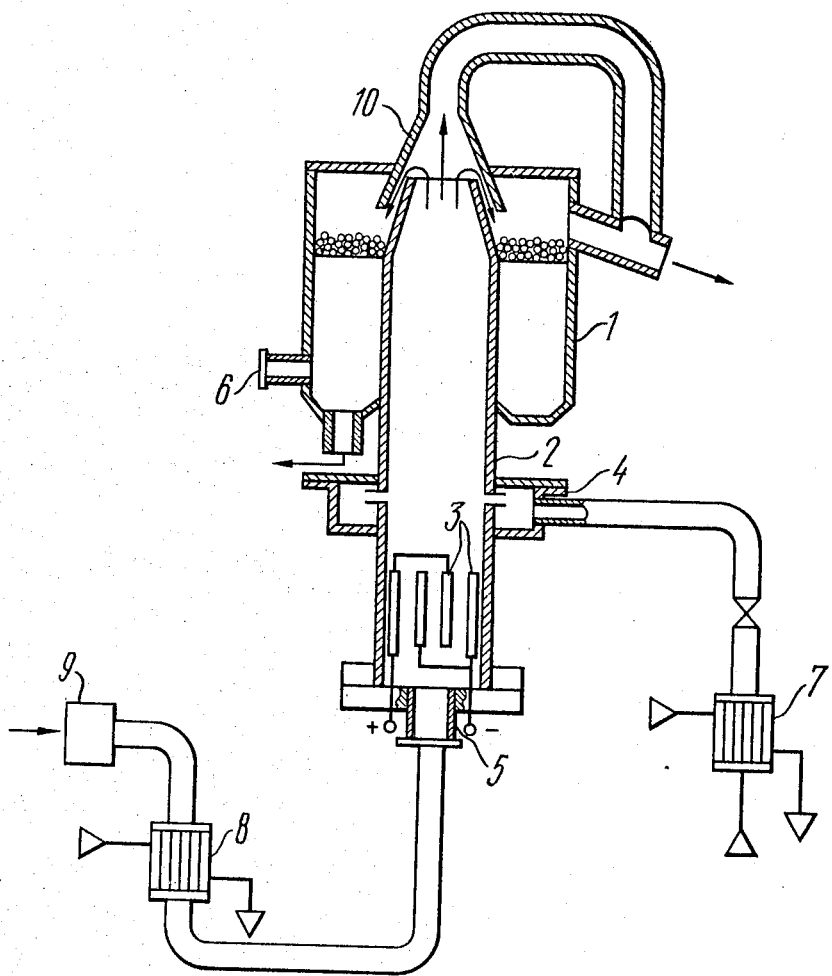

METHOD AND APPARATUS FOR ELECTROCHEMICAL PURIFICATION OF CONTAMINATED LIQUIDS

BACKGROUND OF THE INVENTION

1. Field of the Invention

The present invention relates generally to the purification of contaminated liquids and more particularly to the methods and apparatus for electrochemical purification of contaminated liquids.

The invention may be employed for purifying a liquid contaminated with organic substances, mechanical suspensions, surfactants, and the like. The invention is particularly useful for purifying liquids contaminated with polymers and petroleum products, such as waste water containing oils and fats.

2. Description of the Prior Art

Of all the prior art methods for purifying contaminated liquids, the widest and ever increasing application have recently found methods of electrochemical purification of liquids, such as electroflotation and electroagulation methods due to their high performance capabilities. Known in the art are methods of electrochemical purification of liquids wherein the process of purification is accomplished either discretely or continuously. The latter methods are considered to be more promising.

In a method disclosed in the description of operation of an apparatus for electrochemical purification of contaminated liquids (USSR Inventor's Certificate No. 407,844), the electrochemical purification of contaminated liquids is accomplished by mixing the latter within an electrocoagulation chamber in the space between and above the electrodes with products of dissolution of the electrodes followed by separating formed foam and sludge from the purified liquid within a settling chamber. An apparatus for practicing the above method (disclosed in the above-mentioned Inventor's Certificate) comprises a settling chamber which houses an electrocoagulation chamber and communicates with the latter, and a system of soluble electrodes disposed in the bottom portion thereof. The electrocoagulation chamber comprises an inlet pipe to feed contaminated liquid, disposed beneath the soluble electrodes, while the settling chamber comprises an outlet pipe to discharge purified liquid. In the course of purification, contaminated liquid containing electrolyzing additives (hydrochloric acid, sodium chloride) passes through the soluble electrodes whereto electric current is applied. This brings about the formation of hydroxides of the soluble electrode metal, which hydroxides coagulate impurities contained in the liquid being purified. From the electrocoagulation chamber, said liquid passes into the settling chamber where foam and sludge separate from the liquid, following which the foam, the sludge, and the purified liquid are discharged separately. When passing through the electrodes, the liquid being purified fouls these, which accelerates passivation of the electrodes and, hence, increases the power consumption and necessitates frequent cleaning of the electrodes, i.e. eventually reduces the efficiency of the apparatus.

Known in the art are a method and an apparatus for electrochemical purification of contaminated liquids (Japanese Pat. No. 52-143,973, published Nov. 30, 1977), characterized in that the electrocoagulation chamber serves only to produce coagulants, for which purpose clean electrolyte is fed thereinto, while liquid purification is accomplished in another chamber whereinto the liquid to be purified is fed and wherein the liquid is mixed with the electrolyte containing coagulants and being fed from the electrocoagulation chamber. While greatly diminishing the fouling of the electrode surfaces, the above process and apparatus considerably less utilize the coagulation and flotation capabilities of the electrodes, since when the electrolyte passes from the electrocoagulation chamber to the settling chamber, the coagulants (hydroxides of the soluble electrode metal) and gas bubbles forming on the soluble electrode surface aggregate, which reduces their specific surface and hence impairs the coagulating and flotating capabilities. The above factors adversely affect the apparatus efficiency. Moreover, to install such an apparatus, larger areas are required than for the apparatus of similar efficiency, disclosed in USSR Inventor's Certificate No. 407,844.

Also known in the art are methods and apparatus for electrochemical purification of liquids, characterized in that contaminated liquid is fed into an electrocoagulation chamber through an inlet pipe disposed above the soluble electrodes, while the clean electrolyte is passed in an ascending flow between the electrodes. Mixing the contaminated liquid with products of dissolution of the electrodes is accomplished only in the space above the electrodes. This method and the apparatus for practicing thereof are characterized in that the purification of liquids is accomplished with essentially no fouling of the electrodes and a lesser deterioration of their coagulation and flotation capabilities. The efficiency of the above described method and apparatus is higher than of those disclosed in Japanese Pat. No. 52-143,973.

For example, a method known from the description of operation of an apparatus for electrochemical purification of contaminated liquids (USSR Inventor's Certificate No. 644,738) comprises mixing contaminated liquid within an electrocoagulation chamber above soluble electrodes with an ascending flow of electrolyte containing products of dissolution of the electrodes, followed by separating formed foam and sludge from the purified liquid within a settling chamber.

The apparatus for practicing the above method (disclosed in the above-mentioned Inventor's Certificate) comprises a settling chamber communicated by means of a recirculation pipe with an electrocoagulation chamber disposed therewithin and provided in a bottom portion thereof with a system of soluble electrodes, an inlet pipe to feed a contaminated liquid into the electrocoagulation chamber, and an outlet pipe to discharge the purified liquid from the settling chamber. The inlet pipe to feed the contaminated liquid into the electrocoagulation chamber is disposed above the soluble electrodes. The inlet pipe should be spaced from the electrodes at such a distance which excludes the possibility of fouling the surfaces of the soluble electrodes in the course of purification. Thus, when the inlet pipe is of a cylindrical configuration, the distance should be of (1 to 7)d, where d is a diameter of the inlet pipe.

The main disadvantage of the above described process consists in that an intensive aggregation of coagulants and gas bubbles occurs within the electrocoagulation chamber between the inlet pipe to feed the contaminated liquid and the soluble electrodes, which aggregation is caused by the turbulization of the electrolyte flows. At the same time, the reduction of the distance between the inlet pipe and the electrodes leads to the fouling of the latter, which fouling is rather undesirable. This disadvantage limits capabilities of both the above described apparatus and the method practiced thereby.

SUMMARY OF THE INVENTION

The principal object of the present invention is to raise the efficiency of electrochemical purification of contaminated liquids.

Another important object of the invention is to cut down the power consumption for electrochemical purification of contaminated liquids.

Another object of the invention is to provide an apparatus for electrochemical purification of contaminated liquids, which apparatus allows the efficiency of the purification to be increased.

The above-mentioned and other objects of the invention are attained by that in a method of electrochemical purification of contaminated liquids, comprises passing an electrolyte in an ascending flow through the soluble electrodes provided within the electrocoagulation chamber, mixing contaminated liquid within the electrocoagulation chamber with the ascending electrolyte flow above the soluble electrodes, which flow containing the products of dissolution of the electrodes, and separating formed foam and sludge from the purified liquid within the settling chamber, according to the invention, the flows being mixed are of different temperatures, the contaminated liquid flow being heated while the electrolyte flow is cooled.

The process of mixing liquids having different temperatures occurs more intensively than if said liquids were of the same temperature, which results in the fact that the efficiency of the purification process is increased due to an increase in the coagulation rate. Moreover, the heated contaminated liquid can be fed into the electrocoagulation chamber at a less distance from the upper ends of the electrodes, which reduces the chamber volume not used for mixing, thus reducing the intensity of aggregation of coagulating particles and gas bubbles. This factor provides for a more complete utilization of the products of dissolution of the electrodes, and a decrease in the power consumption.

Tests have shown that it is most preferable to heat the contaminated liquid up to a temperature of 40° to 80° C., and to cool the electrolyte down to a temperature of 5° to 25° C.

The objects set forth and other objects of the present invention are also attained in an apparatus for practicing the method of the invention, comprising a settling chamber having an outlet pipe to discharge purified liquid, said settling chamber communicating with an electrocoagulation chamber disposed therewithin and provided with a system of soluble electrodes in the bottom portion thereof, an inlet pipe to feed contaminated liquid, and an inlet pipe to feed electrolyte, according to the invention, the inlet pipe to feed contaminated liquid communicates with a heater while the inlet pipe to feed electrolyte communicates with a condenser.

BRIEF DESCRIPTION OF THE DRAWINGS

The exact nature of the invention will now be explained by a detailed description of the modifications of the apparatus and by way of examples of the method with reference to the accompanying drawing showing a schematic diagram of the apparatus for practicing the method of the invention.

DETAILED DESCRIPTION OF THE INVENTION

The method of electrochemical purification of contaminated liquids is carried out as follows.

The flow of contaminated liquid being fed into the electrocoagulation chamber is heated up to a temperature of 40° to 80° C., while the flow of electrolyte is cooled down to a temperature of 5° to 25° C. Next, the heated flow of the contaminated liquid is mixed with the electrocoagulation chamber above the soluble electrodes with an ascending flow of the cooled electrolyte containing products of dissolution of the electrodes. Formed foam and sludge are separated within the settling chamber.

The apparatus for practicing the above method (as shown in the drawing), comprises a settling chamber 1 communicating with an electrocoagulation chamber 2 disposed therewithin. In the bottom portion of the electrocoagulation chamber 2 there is disposed a system of soluble plate, e.g. aluminum electrodes 3, an inlet pipe 4 to feed contaminated liquid, and an inlet pipe 5 to feed electrolyte. The settling chamber 1 is provided with an outlet pipe 6 to discharge purified liquid. The inlet pipe 4 to feed contaminated liquid communicates with a heater 7, while the inlet pipe 5 communicates with a condenser 8. A mixer 9 serves for preparing the electrolyte. The drawing also shows a device 10 for removing foam from the apparatus.

The apparatus described above operates as follows.

Prior to the purification of the contaminated liquid, the electrocoagulation chamber 2 and of the settling chamber 1 are filled with the electrolyte which is industrial water containing small amounts of hydrochloric acid or sodium chloride. Direct electric current is applied to the electrodes 3, which current, when passing therethrough and through the electrolyte, causes the formation of aluminium hydroxides and gas bubbles over the surfaces of the above electrodes 3, floating toward the top portion of the electrocoagulation chamber 2. After 25 to 30 secs. of applicaton of electric current to the electrodes 3, contaminated liquid is fed into the electrocoagulation chamber 2 through the pipe 4, which liquid is heated up to a temperature of 40° to 80° C. by the heater 7. In the course of interaction between the contaminated liquid and aluminium hydroxides, there occurs coagulation of the impurities contained in the liquid into aggregates being then carried up the electrocoagulation chamber 2 by gas bubbles. The liquid thus treated is fed into the settling chamber 1 where it is separated from sludge and foam. The foam is then removed from the apparatus by means of the device 10, while the purified liquid is discharged therefrom through the outlet pipe 6.

Provision in the apparatus of the heater 7 intended for heating contaminated liquid, and of the condenser 8 for cooling electrolyte, makes it possible to reduce the distance between the inlet pipe 4 to feed contaminated liquid and the electrodes 3, and to intensify the process of mixing the contaminated liquid with the electrolyte. Said factors ensure both higher efficiency of the apparatus and reduction in the power consumption.

Consider, the instance, an apparatus for electrochemical purification of contaminated liquids, comprising a cylindrical electrocoagulation chamber 2 having a diameter of 0.3 m and a height of 3 m, and a cylindrical settling chamber 1 having a diameter of 1.2 m and a height of 1.1 m. In the bottom portion of the electrocoagulation chamber 2 at a distance of 2 m from a pipe 5 there are disposed 10 pairs of aluminium plate electrodes 3 having a total surface area of 3 m². A heater 7 is disposed opposite the pipe 4, while a condenser 8 is disposed opposite the piper 5. The electrode voltage being 10 V, and a temperature of contaminated liquid being 60° C., the apparatus accomplished purification to a predetermined degree (6 to 36 mg/l) 7.2 m³/h of liquid containing, prior to said purification, more than 2,000 mg/l of organic impurities. Power consumption was 1.4 kW·h/m³, and aluminium consumption was 86 g/m³.

Calculations and analysis of the purified liquid and those of the foam product discharged from the apparatus, have shown that aluminum hydroxides were utilized in an amount of 92 to 98% of the total quantity thereof.

At the same time, an apparatus disclosed in USSR Inventor's Certificate No. 644,738 when used for purification of a similar liquid and wherein temperatures of contaminated liquid and of electrolyte in the process of electrochemical purification are equal, is characterized by the following indices:

| purification rate | 5.2 to 6 m³/h |
| power consumption | 2.5 kW · h/m³ |
| aluminium consumption | 160 g/m³ |
| utilization of aluminium hydroxide for purification | 55 to 60% |

The invention is further explained in terms of specific examples of practicing the method.

EXAMPLE 1

Contaminated liquid was purified, according to the invention, as follows. Contaminated liquid containing emulsified oils in an amount of 2,400 mg/l and having viscosity of $0.72 \cdot 10^3$ N·s/m², and density of 0.980 g/cm³, was heated up to a temperature of 40° C. An electrolyte being industrial water and containing small additives of hydrochloric acid was cooled down to a temperature of 5° C., was passed between soluble aluminum electrodes whereto direct electric current having a voltage of 10 V was applied. After one hour, 7.0 m³/g of the contaminated liquid were purified. The purified liquid containing 10.0 to 24.0 mg/l additives was discharged from a settling chamber.

The degree of purification was 99.2 to 99.8%.

The following table shows the Examples 2 through 9 of the inventive method of purification of contaminated liquids following an example of purifying a cutting liquid having an initial content of impurities of 2,400 mg/l.

temperature of 60° C. while the electrolyte has been cooled down to a temperature of 20° C.

When raising the temperature of the contaminated liquid above 80° C., density and viscosity thereof are lowered resulting in an increase in gas bubbles size, and in reduction of floating capability thereof. At temperatures above 90° C., an intensive vaporization occurs in the contaminated liquid, which vaporization sharply deteriorates the process of coagulation of impurities.

It is to be understood that the present invention is not limited by the above described embodiments thereof, and that numerous modifications and variations of the method and apparatus of the invention are possible without departing from the scope and spirit of the present invention.

What is claimed is:

1. A method of electrochemical purification of contaminated liquids, comprising:
   heating a contaminated liquid to a temperature at least in the order of 40° C.;
   cooling an electrolyte to at least in the order of 25° C.;
   passing said cooled electrolyte through a region having energized soluble electrodes provided within an electrocoagulation chamber;
   mixing said heated contaminated liquid within said electrocoagulation chamber above said soluble electrodes with an ascending flow of said cooled electrolyte containing products of dissolution of said soluble electrodes;
   separating formed foam and sludge from the mixture of contaminated liquid and electrolyte within a settling chamber.

2. A method as set forth in claim 1, wherein the contaminated liquid is heated up to a temperature of 40° to 80° C., while the electrolyte is cooled down to a temperature of 5° to 25° C.

3. An apparatus for purification of contaminated liquids comprising:
   a settling chamber provided with an outlet pipe to discharge purified liquid from said settling chamber;
   an electrocoagulation chamber disposed within said settling chamber and provided with an inlet pipe to feed heated contaminated liquid into said electrocoagulation chamber;
   an inlet pipe to feed cooled electrolyte into said electrocoagulation chamber;
   a system of soluble electrodes disposed in a bottom portion of said electrocoagulation chamber;
   a heater communicating with said inlet pipe to feed heated contaminated liquid thereto heated to at

| No. | Temperature of contaminated liquid | Temperature of electrolyte | Density of contaminated liquid, g/cm³ | Viscosity of contaminated liquid × $10^3 \frac{N \cdot S}{m^2}$ | Concentration of additives in purified liquid, mg/l | Apparatus capacity, m³/h | Power consumption, kW · h/m³ |
|---|---|---|---|---|---|---|---|
| 2 | 40 | 10 | 0.980 | 0.684 | 6 to 36 | 6.2 | 2.0 |
| 3 | 40 | 20 | 0.980 | 0.684 | 6 to 36 | 5.9 | 2.2 |
| 4 | 30 | 5 | 0.990 | 0.870 | 6 to 36 | 5.8 | 2.1 |
| 5 | 60 | 5 | 0.973 | 0.543 | 6 to 36 | 6.4 | 1.8 |
| 6 | 60 | 20 | 0.973 | 0.543 | 6 to 36 | 7.2 | 1.4 |
| 7 | 80 | 15 | 0.960 | 0.441 | 6 to 36 | 7.0 | 1.6 |
| 8 | 90 | 15 | 0.952 | 0.392 | 6 to 36 | 6.7 | 1.9 |
| 9 | 35 | 30 | 0.993 | 0.940 | 6 to 36 | 5.6 | 2.5 |

In all of the examples shown in the above table, the content of impurities in the purified liquid was 6 to 36 mg/l. As it can be seen from the above table (Example 6), the apparatus possesses the highest purification rate when the contaminated liquid has been heated up to a least in the order of 40°; and
a condenser communicating with said inlet pipe to feed cooled electrolyte thereto cooled to at least in the order of 25° C.

* * * * *